United States Patent [19] [11] 3,862,263
Maruta et al. [45] Jan. 21, 1975

[54] PRODUCTION OF MODIFIED POLYPHENYLENE OXIDE

[75] Inventors: Isao Maruta, Takatsuki; Seizo Nakashio, Nishinomiya; Kazuo Hayatsu; Yoichi Kono, both of Takatsuki, all of Japan

[73] Assignee: Sumitomo Chemical Company, Limited, Osaka, Japan

[22] Filed: Feb. 21, 1973

[21] Appl. No.: 334,356

Related U.S. Application Data

[63] Continuation-in-part of Ser. No. 92,874, Nov. 25, 1970, abandoned.

[30] Foreign Application Priority Data

Nov. 29, 1969 Japan............................ 44-95834
Dec. 4, 1969 Japan............................ 44-97715
Dec. 4, 1969 Japan............................ 44-97716

[52] U.S. Cl. ......... 260/874, 260/29.6 RB, 260/874, 260/876, 260/880, 260/886, 260/892
[51] Int. Cl. ............................................ C08f 41/12
[58] Field of Search................. 260/874, 29.6, 880

[56] References Cited
UNITED STATES PATENTS

| | | | |
|---|---|---|---|
| 3,356,761 | 12/1967 | Fox..................................... | 260/874 |
| 3,384,682 | 5/1968 | Erchak et al. ...................... | 260/874 |
| 3,487,127 | 12/1969 | Erchak et al. ...................... | 260/876 |
| 3,509,238 | 4/1970 | Aubrey et al....................... | 260/876 |
| 3,700,630 | 10/1972 | Hamada et al. .................... | 260/17.2 S |

FOREIGN PATENTS OR APPLICATIONS

1,551,503   11/1968   France............................ 260/880 R

*Primary Examiner*—Murray Tillman
*Assistant Examiner*—C. J. Seccuro
*Attorney, Agent, or Firm*—Stevens, Davis, Miller & Mosher

[57] ABSTRACT

A relatively small amount of styrene can be smoothly graft-polymerized on a polyphenylene oxide with a high graft efficiency and in a high polymerization yield by polymerizing 0.4 to 2 parts by weight of a styrene compound in the presence of 1 part by weight of a polyphenylene oxide, or 15 to 60 parts by weight of a styrene compound in the presence of 40 to 85 parts by weight of a mixture comprising 74 to 96% by weight of a polyphenylene oxide and 26 to 4% by weight of a rubbery polymer, in an aqueous dispersion containing a dispersion stabilizer and a radical initiator.

In order to carry out the polymerization reaction more efficiently and more smoothly, it is preferable that the styrene compound in excess of the amount to be contained in the final graft polymer is initially made present in the polymerization system, unreacted styrene compound is removed in the form of an azeotropic mixture with water by distillation in the course of polymerization, thereby leaving the desired amount of styrene in the system, and the reaction is further continued to complete the polymerization. In this manner, a bead-like graft polymer excellent in surface state and having a smaller diameter can be obtained.

8 Claims, No Drawings

PRODUCTION OF MODIFIED POLYPHENYLENE OXIDE

CROSS REFERENCE TO THE RELATED APPLICATION

This is a continuation-in-part application of the copending application Ser. No. 92,874 filed Nov. 25, 1970 now abandoned.

This invention relates to a process for producing modified polyphenylene oxides having excellent characteristics.

Polyphenylene oxides have widely been known as resins which are excellent in such properties as heat resistance, chemical resistance and mechanical and electrical properties. On the other hand, however, they are inherently high in softening point and low in fluidity, and hence have such drawback as being relatively inferior in processability. For the improvement of polyphenylene oxides in processability and moldability without injuring their excellent properties, there have been proposed processes in which a styrene compound is polymerized in the presence of polyphenylene oxides (Japanese Patent Publication No. 22069/67, Dutch Patent Application Nos. 66-17395 and 66-17529, and French Pat. No. 1,551,503), and processes in which a large amount of styrene is polymerized in a suspension type aqueous dispersion in the presence of a polyphenylene oxide and a rubber component (Dutch Patent Application No. 66-17529 and French Pat. No. 1,551,503).

In case a styrene compound is polymerized in the presence of a polyphenylene oxide, like in the above-mentioned processes, the polyphenylene oxide prohibits or inhibits the polymerization of the styrene compound to lower the polymerization yield of the styrene compound and, particularly when the polyphenylene oxide is used in a large amount, there are some cases where the polymerization does not progress at all. Accordingly, no substantial polymerization can be progressed unless the polyphenylene oxide is used in an amount as small as possible to make the concentration of the styrene compound higher. This phenomenon is observed also in the case where a styrene compound is polymerized in an aqueous dispersion in the presence of a polyphenylene oxide and a rubber component. For the above reasons, Japanese Patent Publication No. 22,069/67, Dutch Patent Application No. 66-17529 and French Pat. No. 1,551,503 use the styrene compound in, respectively, 9 times, more than 8 times and 3.5 times the amount of the polyphenylene oxide. Further, Dutch Patent Application Nos. 66-17395 and 66-17529 and French Patent No. 1,551,503 disclose that styrene is polymerized in a suspension type aqueous dispersion system in the presence of a polyphenylene oxide, and Dutch Patent Application No. 66-17529 and French Pat. No. 1,551,503 use rubber or acrylonitrile in addition to styrene. In all the above-mentioned processes, however, the styrene is used in a large amount than that of the polyphenylene oxide, and therefore, the said processes should be said to be techniques concerning the modification of styrene rather than the modification of polyphenylene oxides. Accordingly, in order to decrease, according to any of the above-mentioned processes, the styrene content of the polymerization product, it is necessary to lower the polymerization yield.

In case the polymerization is carried out in a suspension system, however, there is observed such a phenomenon that even if the styrene content of the polymerization product is intended to be decreased by lowering the polymerization yield, a large amount of unreacted styrene remains in the polymerization product, since the polymerization product is in the form of beads. The unreacted monomer relatively high in boiling point, which is contained in such beads, is difficultly removable by drying, with the result that a molded article obtained from the polymerization product is greatly injured in appearance and is also deteriorated in physical properties.

In short, in polymerizing a styrene compound in the presence of a polyphenylene oxide, it is necessary that the styrene compound is used in a larger amount to exclude the polymerization-prohibiting or -inhibiting action of the polyphenylene oxide. As the result, the graft efficiency of the styrene compound on the polyphenylene oxide becomes low and the polymerization product is substantially a mixture of the polyphenylene oxide and a polymer of the styrene compound. It is well known, in general, that such a mixture is greatly different in physical properties from a graft polymer high in graft efficiency. On the other hand, in case the polymerization yield is lowered in order to decrease the styrene content of the polymerization product, unreacted monomer remains in the polymerization product, whereby a molded article obtained therefrom is deteriorated in physical properties.

The present inventors previously proposed processes in which at least one styrene compound was polymerized in the presence of a polyphenylene oxide or in the presence of a polyphenylene oxide and a rubbery polymer to make it possible to attain a high polymerization yield and a high graft efficiency (Japanese Patent Application Nos. 56,501/68 and 525/69).

The inventors further advanced their studies to find a process for producing a polyphenylene oxide modified by graft polymerization with a styrene compound which is higher in graft efficiency and molecular weight of the polystyrene portion.

An object of the present invention is to provide a process in which a relatively small amount of a styrene compound is substantially completely graft-polymerized on a polyphenylene oxide.

Another object of the invention is to provide a process in which a relatively small amount of a styrene compound is substantially completely graft-polymerized on a mixture of a polyphenylene oxide and a rubbery polymer.

A further object of the invention is to provide a process in which the graft-polymerization of a relatively small amount of a styrene compound on a polyphenylene oxide or a mixture of a polyphenylene oxide and a rubbery polymer is progressed more smoothly by effecting distillation during the graft polymerization to remove an excess portion of the styrene compound and the remainder is further graft-polymerized.

A still further object of the invention is to provide a process for producing a modified polyphenylene oxide composed of fine beads excellent in surface state.

A still further object of the invention is to provide a process for producing a graft polymer of a styrene compound on a polyphenylene oxide which is high in graft efficiency of the styrene compound and contains a high molecular weight graft-polymer portion of styrene compound.

Other objects and advantages of the present invention will become apparent from the following description.

The above-mentioned objects of the present invention can be accomplished by polymerizing in an aqueous dispersion containing a dispersion stabilizer and a radical initiator, 0.4 to 2 parts by weight of a styrene compound in the presence of 1 part by weight of a polyphenylene oxide, or 15 or 60 parts by weight of a styrene compound in the presnece of 85 to 40 parts by weight of a mixture comprising 74 to 96% by weight of a polyphenylene oxide and 26 to 4% by weight of a rubbery polymer.

In order to accomplish the graft polymerization with the high graft efficiency which is an object of the present invention, it has been known experientially that a solution of mixture of a polyphenylene oxide and a styrene compound or mixture of a polyphenylene oxide, a styrene compound and a rubbery polymer should have a viscosity in some extent at a polymerization temperature. In this sense, the viscosity of the mixture solution in the conventionally known process is not so high as requested to accomplish the graft polymerization with the high graft efficiency. On the other hand, it was recognized that said solution viscosity increases exponentially depending on the content of the polyphenylene oxide which is a solute in the solution. In case of the composition of the present invention, the solution is very viscous as compared with that of the conventionally known process. However, if the solution is too viscous, the each component cannot smoothly be dipersed. Based on the reason as above, the composition of polyphenylene oxide, styrene compound and rubbery polymer according to the present invention is appropriate.

According to the present invention, the amount of the residual unreacted monomer contained in the polymerization product is so small that the appearance of a molded article obtained by subjecting the polymerization product to extrusion molding or injection molding is not injured at all.

Further, in accordance with the present invention, it is possible to produce a graft polymer which is high in graft efficiency of styrene compound and contains a high molecular weight graft polymer portion of styrene compound. In case the graft efficiency of styrene compound is high, the graft polymer obtained is more excellent in modulus, fluidity, creep, stress relaxation, tensile modulus, flexural modulus, Vicat softening point, and transparency than a mere mixture of a polyphenylene oxide with a polymer of styrene compound or modified polyphenylene oxide low in graft efficiency of styrene compound, and is favorable in temperature dependency of physical properties and in processability. These properties are of importance in consideration of the fact that the polyphenylene oxide has characteristics as a polymer used at elevated temperature. Furthermore, the high molecular weight of the graft polystyrene portion is markedly preferable in view of the tensile strength and the like properties.

The styrene compound, which is polymerized in the present invention, is a styrene represented by the formula,

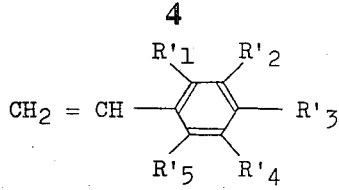

wherein $R'_1, R'_2, R'_3, R'_4$ and $R'_5$ are independently a hydrogen atom, a halogen atome, a cyano group, a nitro group, an amino group, a hydroxy group, a carboxyl group or a hydrocarbon or a halogen- or a cyano-substituted hydrocarbon group having 12 or less carbon atoms, or a hydrocarbonoxy or a halogen- or hydrocarbonoxy-substituted hydrocarbonoxy group, in which the number of carbon atoms is 12 or less, or a mixture of said styrene with an α-substituted styrene represented by the formula,

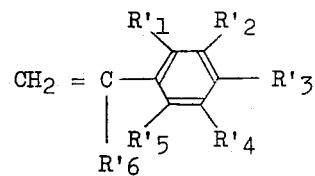

wherein $R'_1, R'_2, R'_3, R'_4$ and $R'_5$ are as defined above, and $R'_6$ is a hydrocarbon group, in which the number of carbon atoms is 12 or less.

As examples of said $R'_1, R'_2, R'_3, R'_4$ and $R'_5$ in the above-mentioned formula representing the styrene compound used in the present invention, there may be shown hydrogen; halogen atoms such as chlorine, bromine and iodine atoms; cyano groups; nitro groups; amino groups; carboxyl groups; hydrocarbon grous such as methyl, ethyl, propyl, heptyl, dodecyl, vinyl, allyl, benzyl and methylbenzyl groups; halogen- or cyano-substituted hydrocarbon groups such as chloromethyl, bromomethyl and cyanoethyl groups; and hydrocarbonoxy and halogen- or hydrocarbonoxy-substituted hydrocarbonoxy groups such as methoxy, ethoxy, phenoxy, monochloromethoxy and (methoxy)-methoxy groups.

As examples of said $R'_6$, there may be shown methyl, ethyl, propyl, pentyl, nonyl, undecyl and phenyl groups.

Typical examples of the styrene include styrene, 2,4-dichlorostyrene, p-methoxystyrene, p-nitrostyrene, p-methylstyrene, 3,4-dimethylstyrene, m-tert-butylstyrene, p-dodecylstyrene, p-phenylstyrene, p-acetoxystyrene, divinylbenzene, p-aminostyrene, p-(chloromethoxy)-styrene, m-cyanostyrene, p-vinyl benzoic acid and o-hydroxystyrene; and typical examples of the α-substituted sytrene include α-methylstyrene, α-propylstyrene, α-undecylstyrene, o-methyl-α-methylstyrene, m-methyl-α-methylstyrene, p-methyl-α-methylstyrene, p-methoxy-α-methylstyrene, p-cyano-α-methylstyrene, m-bromo-α-methylstyrene, p-chloro-α-methylstyrene and 1,1-diphenylethylene. These styrenes or α-substituted styrenes may be used either alone or in admixture of 2 or more.

Examples of the rubbery polymer used in the present invention include polybutadiene, polyisoprene (including natural rubber), polychloroprene, butadiene-styrene copolymers, butadiene-styrene block copolymers, polybutadiene-styrene graft copolymers, polyisoprene-styrene graft copolymers, isoprene-styrene copolymers, isobutyrene-isoprene copolymers, polybutadiene-acrylonitrile-styrene graft copolymers, butadiene-acryionitrile copolymers, polybutadiene-styrene-α-methylstyrene graft copolymers, polybutadiene-styrene-methyl methacrylate graft copolymers, poly(butadiene-styrene)-styrene graft copolymers, poly(butadiene-styrene)-styrene-acrylonitrile graft copolymers, polychloroprene-styrene graft copolymers, poly(butadiene-acrylonitrile)-styrene graft copolymers and ethylene-styrene copolymers.

The polyphenylene oxide used in the present invention has a structure represented by the general formula,

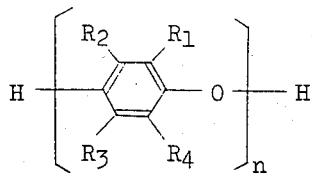

wherein $R_1$, $R_2$, $R_3$ and $R_4$ are independently a hydrogen atom, a halogen atom, a hydrocarbon or a halogen- or cyano-substituted hydrocarbon group having 12 or less carbon atoms, or a hydrocarbonoxy or a halogen- or cyano-substituted hydrocarbonoxy group having 12 or less carbon atoms; and $n$ represents the degree of polymerization, and is an integer greater than 50.

As examples of said $R_1$, $R_2$, $R_3$ and $R_4$, there may be shown hydrogen, chlorine, bromine and iodine atoms, and methyl, ethyl, propyl, allyl, phenyl, benzyl, methylbenzyl, chloromethyl, bromomethyl, 2-chloroethyl, cyanoethyl, methoxy, monochloromethoxy, ethoxy and phenoxy.

Typical examples of the polyphenylene oxide include poly-2,6-dimethyl-1,4-phenylene oxide, poly-2,6-diethyl-1,4-phenylene oxide, poly-2,6-dipropyl-1,4-phenylene oxide, poly-2-methyl-6-allyl-1,4-phenylene oxide, poly-di-tert-butyl-dimethoxy-1,4-phenylene oxide, poly-2,6-dichloromethyl-1,4-phenylene oxide, poly-2,6-dibromomethyl-1,4-phenylene oxide, poly-2,6-di(2-chloroethyl)-1,4-phenylene oxide, poly-2,6-ditolyl-1,4-phenylene oxide, poly-2,6-dichloro-1,4-phenylene oxide, poly-2,6-diphenyl-1,4-phenylene oxide and poly-2,5-dimethyl-1,4-phenylene oxide.

The catalysts used in the present invention are an organic or inorganic radical initiators which are ordinarily used as polymerization catalysts for styrene compounds. Among these, organic peroxides are preferable in veiw of the physical properties of the resulting graft polymers.

Typical examples of the catalysts include decanoyl peroxide, benzoyl peroxide, lauroyl peroxide, octanoyl peroxide, stearoyl peroxide, 3,5,5-trimethylhexanoyl peroxide, tert-butyl perbonzoate, tert-butyl peracetate, tert-butyl perpivalate, diisopropylbenzene hydroperoxide, 2,5-dimethyl-2,5-di-tert-butyl peroxyhexane, di-tert-butyl peroxide, cyclohexanone peroxide, dicumyl peroxide, α,α'-azobisisobutyronitrile, tertbutyl peroxyisobutyrate and tert-butyl peroxylaurate.

These radical initiators are preferably high temperature decomposing type catalysts or are used in the form of a combination of 2 or more catalysts, e.g. a combination of a low temperature decomposing type catalyst with a high temperature decomposing type catalyst. In case the combination of a low temperature decomposing type catalyst with a high temperature decomposing type catalyst is used, the polymerization is effected initially at below about 90°C. and, after a certain extent of polymerization yield has been attained, the temperature of the system is elevated to carry out the polymerization substantially completely at a high temperature.

Preferable combinations of the catalyst used in the present invention include the combinations of lauroyl peroxide with dicumyl peroxide; lauroyl peroxide with di-tert-butyl peroxide; lauroyl peroxide with tert-butyl peroxybenzoate; lauroyl peroxide with 2,5-dimethyl-2,5-di-tert-butyl peroxyhexane; lauroyl peroxide with benzoyl peroxide; 3,5,5-trimethylhexanoyl peroxide with dicumyl peroxide; 3,5,5-trimethylhexanoyl peroxide with tert-butyl peroxybenzoate; 3,5,5-trimethylhexanoyl peroxide with benzoyl peroxide; 3,5,5-trimethylhexanoyl peroxide with di-tert-butyl peroxide; tert-butyl peroxypivalate with di-tert-butyl peroxide; tert-butyl peroxypivalate with dicumyl peroxide; tert-butyl peroxypivalate with tert-butyl peroxybenzoate; 2,4-dichlorobenzoyl peroxide with tert-butyl peroxybenzoate; 2,4-dichlorobenzoyl peroxide with dicumyl peroxide; 2,4-dichlorobenzoyl peroxide with di-tert-butyl peroxide; 2,4-dichlorobenzoyl peroxide with 2,5-dimethyl-2,5-di-tert-butyl hexane; octanoyl peroxide with dicumyl peroxide; and octanoyl peroxide with di-tert-butyl peroxide.

In order to make the polymerization rate greater, there may be used a redox catalyst prepared by combining any of the aforesaid radical initiators with a reducing agent. Examples of such reducing agent include dimethylaniline, p-chlorobenzenesulfinic acid, benzoin and acetoin.

In the present invention, the catalyst may be used in an amount suitable for polymerization of the styrene compound. For adequate practice of the present invention, the catalyst is used in an amount of 0.01 to 10% by weight, preferably 0.3 to 10% by weight, based on the weight of the fed styrene compound. This preferable amount of the catalyst used in the present invention is larger than the amount of a catalyst which is ordinarily used for polymerization of styrene compounds. This, however, is believed ascribable to the fact that the polyphenylene oxide shows a polymerization-prohibiting or -inhibiting action, as explained previously. It is well known, in general, that if a polymerization catalyst is used in a large amount, the molecular weight of the resulting polymer tends to become low. Nevertheless, the molecular weight of the graft polystyrene portion obtained according to the present invention is high. In this point also, a characteristic of the present invention resides, though the reason therefor is not clear at present. Such a fact has never been imagined prior to the present invention.

The amount of the water used in the present invention may be any amount so far as the dispersion state of the reaction system is made favorable. Generally, however, the water is used in an amount of at least 0.7 part by weight, preferably 1 to 10 parts by weight, per part by weight of the mixture of polyphenylene oxide, rubbery polymer and styrene compound.

The aqueous dispersion used in the present invention contains a dispersion stabilizer. Examples of such dispersion stabilizer include polyvinyl alcohol, gelatine, agar, starch, glycerine, sodium salt of polyacrylic acid and polymethacrylic acid, polyethylene glycol, ethylene glycol, polyacrylamide and 1:1 copolymer of styrene and maleic anhydride. The amount of the dispersion stabilizer to be used is not particularly limited, but is ordinarily 0.0001 to 3% by weight, preferably 0.001 to 1.5% by weight, more preferably 0.01 to 1.5% by weight, based on the weight of the water used. Further, when such a cationic, anionic or nonionic surface active agent as hydroxyethyl cellulose, carboxymethyl cellulose, methyl cellulose, rosin soap, sodium glycolate, sodium dodecylbenzenesulfonate, sodium stearate, polyoxyethylene monooleate, polyoxyethylene distearate, polyoxyethylene lauryl ether, or lauryl trimethylammonium chloride is used in combination with the dispersion stabilizer, there can be attained such effects that the aqueous dispersion system is stabilized and the surface of the beads of the resulting polymer is made smooth. The amount of the surface active agent to be used is 0.00005 to 0.5% by weight, preferably 0.0005 to 0.5% by weight, based on the weight of the water used, though the use thereof is not particularly required in case the dispersion stabilizer is used. In addition thereto, there may be used as a so-called adhesion-preventing agent a water-insoluble inorganic compound such as, for example, a carbonate, silicate, sulfate or phosphate of calcium, magnesium, lead or barium; an oxide such as alumina, bentonite, talc, clay, titanium oxide or lead oxide; or a silicate, whereby the stability of the beads is further enhanced. The use of such adhesion-preventing agent is not always required. When the adhesion-preventing agent is desired to be used, the amount thereof is preferably about 0.01 to 5% by weight based on the weight of the water, though the amount is not particularly restricted. Further, water-soluble inorganic salts, e.g. sodium sulfate, may also be added for smooth progress of the polymerization. The addition of these inorganic salts additionally gives such effect that the dispersion is prevented from emulsification due to fine granulation. These dispersion stabilizers may be used either singly or in admixture of 2 or more. When these dispersion stabilizers are used, there are some cases where foaming takes place at the time of distilling-off of the excess styrene compound to disturb the operation. If a suitable defoaming agent is used, however, favorable effects can be expected. As such defoaming agent, there is used, for example, octyl alcohol and silicone oil.

Further, plasticizers, lubricants, colorants and stabilizers may have previously been added to the system so fas as no particular detrimental effect is brought about in the polymerization of styrene compound.

In case the content of the polymer of styrene compound in the polymer beads obtained according to the present invention is required to be controlled, the composition may have, of course, been controlled at the time of feeding. Alternatively, however, the above object can be easily accomplished according to the 2-stage process by distilling off the excess unreacted monomer during the polymerization.

According to the present invention, in order to carry out the polymerization reaction more smoothly, it is preferably that the styrene compound fed initially in excess to the system is removed in the form of an azeotropic mixture with water by distillation in the course of polymerization to adjust to the composition of a desired modified polyphenylene oxide and then the polymerization is completed (this process is hereinafter referred to as the 2-stage process).

In the 2-stage process of the present invention, the styrene compound initially fed is not limited in amount. However, if the amount of the styrene compound is of excess, the amount of the monomer to be distilled off in order to adjust the styrene compound to a final composition becomes undesirable large. Accordingly, it is preferable to use the styrene compound in an amount of less than 20 parts by weight per part by weight of the polyphenylene oxide or a mixture thereof with a rubbery polymer.

According to the 2-stage process of the present invention, not only the unreacted styrene can be distilled off at a low temperature by utilization of the -azeotropic distillation thereof with water, which is a dispersion medium, but also the resulting, modified polyphenylene oxide is composed of fine beads, which are favorable in surface state. The modified polyphenylene oxide obtained in the form of such fine beads makes it possible to uniformly disperse such additives as stabilizer, lubricant, plasticizer and colorant at the time of after-treatment, e.g. removal of water, and at the time of molding.

In the 2-stage process of the present invention, the polymerization reaction is progressed in an aqueous dispersion and, in the course of the said reaction, excess styrene compound is distilled off. When roughly divided, this process may be carried out according to any of such procedures that from an aqueous dispersion prepared by dispersing oil drops composed of a polyphenylene oxide and a styrene compound into water in the presence or absence of a rubbery polymer, (1) excess monomer is distilled off at the stage where the styrene compound has not been polymerized or has sparingly been polymerized, and (2) the excess monomer is distilled off at the time when the polymerization has progressed to a certain extent.

For the distilling-off of the said excess unreacted styrene compound, azeotrophic distillation thereof with water is utilized as far as possible. This distilling-off can be effected not only at atmospheric pressure but also under pressure. What is to be noted here is that in case the excess monomer is desired to be distilled off according to the procedure (2), the initial polymerization yield of the styrene compound is preferably controlled to a low degree to increase the graft efficiency of the styrene compound. Taking this point into consideration, the distilling-off of excess styrene compound and the polymerization may be carried out in parallel to each other.

Further, there is a close relation between the time of distilling-off of excess styrene compound (i.e. the initial polymerization yield of the styrene compound), the dispersion stabilizer and the catalyst.

For example, there is a process in which the excess monomer is distilled off after effecting the polymerization to a certain extent at below about 90°C by use of a catalyst system comprising a low temperature decomposing type catalyst in combination with a high temperature decomposing type catalyst, and then the remaining monomer is polymerized substantially completely at a higher temperature, or a process in which the polymerization is effected at a high temperature from the beginning by use of a high temperature decomposing type catalyst, unreacted monomer is distilled off in the course of the polymerization and then the polymerization is terminated at a higher temperature. Alternatively, there is a process using a catalyst system comprising a low temperature decomposing type catalyst in combination with a high temperature decomposing type catalyst, in which excess monomer is distilled off at the initial stage of polymerization, and the polymerization is first effected at below about 90°C to a polymerization yield of a certain extent and then terminated at a higher temperature, or a process using only a high temperature decomposing type catalyst, in which excess monmer is distilled off at the initial stage of polymerization and then the polymerization is completed.

The above-mentioned matters do not signify that the present invention cannot be accomplished by use of only a low temperature decomposing type catalyst. Even when a low temperature decomposing type catalyst is used alone, the present invention can successfully be accomplished if the amount of the catalyst is made larger.

In the present invention, there is no restriction in the order and manner of addition of the polyphenylene oxide, the rubbery polymer, the styrene compound, various dispersion stabilizers and other additives. However, it is preferable that the catalyst and/or the rubbery polymer have previously been dissolved or dispersed in the styrene compound or the polyphenylene oxide solution in styrene compounds in order to distribute them uniformly.

If, in the present invention, the styrene compound has been used in a small amount and hence has been fed at about room temperature, the mixture of the polyphenylene oxide and the styrene cannot be brought into the form of a solution but is in the form of a wet powder. For smooth progress of the polymerization reaction according to the present invention, therefore, it is desirable that the polyphenylene oxide has sufficiently been wet with the styrene compound. Even in such a state, the reaction mixture can be formed into a homogeneous suspension when the temperature is elevated to melt the mixture. Such a phenomenon has not been anticipated because the amount of the styrene compound is small. It appears that this phenomenon is peculiar to polyphenylene oxides.

In case an impact resistant modified polyphenylene oxide, for example, is desired to be produced according to the process of the present invention, it is preferable, in some cases, that the rubber component takes part in the graft polymerization reaction, while maintaining an agglomerated state of particles having a suitable particle diameter. Preferable particle diameter is 0.1 to 10 microns.

The polymerization reaction of the present invention is not particularly restricted in reaction temperature so far as the water, which is a dispersion medium, is in the form of a liquid. The reaction can be effected not only at normal pressure and under pressure but also under reduced pressure.

In the present invention, the molecular weight of the styrene compound grafted on the polyphenylene oxide or the rubbery polymer can be controlled by varying the temperature and the amounts and kinds of the styrene compound, the polyphenylene oxide, the rubbery polymer and the catalyst. Alternatively, however, the molecular weight may be controlled by adding a chain transfer agent which is used in an ordinary polymerization reaction. Such chain transfer agent includes mercaptans, alcohols, etc. When the molecular weight and the number of branches of the grafted styrene compound are controlled, the physical properties of the resulting graft polyphenylene oxide can also be varied.

Graft polymers produced according to the present invention has not only been improved in fluidity without being greatly changed in properties inherent to polyphenylene oxides but also been enhanced in oxidation resistance and impact resistance. For example, even if the free hydroxyl groups of polyphenylene oxides used have not been treated at all, the resulting graft polymers are less in color tome variation and high in resistance to oxidation at elevated temperatures. This is considered ascribable to the fact that the present process is far higher in graft conversion of styrene compound than the prior art process.

The present invention is illustrated below with reference to examples, but the examples are illustrative and not limitative, and various modifications are possible within the scope of the present invention.

Evaluations of polymers and physical properties were effected in the manners described below. The test piece used in the evaluation of physical properties was prepared from a sheet obtained by roll-kneading a sample at 220°C for 5 minutes and then pressing the sample at 240°C for 10 minutes under 100 kg/cm². Syrene graft conversion:

The graft conversion was evaluated in the following manner:

A sample polymer was extracted under reflux with acetone containing 20% by weight of cyclohexane. After filtering at an elevated temperature, the extract was charged with fresh acetone containing 20% by weight of cyclohexane and then subjected to extraction. This operation was repeated 10 times, and the extraction treatment was effected for 30 hours. The extraction residue is a graft polymer.

From the yield of the graft polymer, the styrene graft conversion was calculated according to the following equation:

The case where no rubbery polymer was used:

Styrene graft conversion (percent)

$$= \frac{(\text{Weight of graft polymer}) - (\text{Weight of fed polyphenylene oxide})}{\text{Weight of fed styrene*}} \times 100$$

The case where a rubbery polymer was used:

Styrene graft conversion (percent)

$$= \frac{(\text{Weight of graft polymer}) - \left(\begin{array}{c}\text{Weight of fed polyphenylene oxide} \\ +\text{Weight of fed rubbery polymer}\end{array}\right)}{\text{Weight of fed styrene*}} \times 100$$

Note: *In the 2-stage process, it refers to the weight of styrene in the second stage.

Molecular weight of graft styrene:

The extract obtained by extraction with a cyclohexane solution in order to calculate the styrene graft conversion was re-precipitated by use of methanol, and the intrinsic viscosity $[\eta]$ of the resulting homopolystyrene was measured in benzene at 25°C. From this intrinsic viscosity $[\eta]$, an average molecular weight $\overline{Mn}$ was calculated according to F. R. Mayo's equation, $$\overline{Mn} = 1.67 \times 10^5 \, [\eta]^{1.37}$$

and said average molecular weight was regarded as the molecular weight of the graft styrene.

Content of unreacted styrene in graft polymer beads:

The content of unreacted styrene was measured according to gas chromatography and represented by wt%.

Tensile strength and tensile modulus:

These were measured at room temperature at a tensile rate of 10 mm/min. according to JIS-6745 (JIS is an abbreviation of Japanese Industrial Standard).

Impact strength:

Measured at 20°C with notch according to JIS-6745.

Vicat softening point:
  Measured according to ASTM D1525-65T.
Coloration degree:
  The color of a film sheet (thickness 1 mm) prepared by pressing a sample under conditions of 270°C, 100 kg/cm² and 10 minutes was visually evaluated.
  In the examples, all parts and percentages are by weight unless otherwise specified, and poly-2,6-dimethyl-1,4-phenylene oxide is referred to as PPO.

EXAMPLE 1

To a 500 ml round-bottomed pressure-resistant polymerization reaction means equipped with a thermometer, a nitrogen-injecting pipe and a magnetic stirrer were added given amounts of poly(2,6-dimethyl-1,4-phenylene oxide) ($[\eta] = 0.65$, measured in chloroform at 25°C) obtained according to polymerization by oxidative coupling using a manganese chloride (II)-sodium methylate catalyst, styrene, lauroyl peroxide and dicumyl peroxide. The compounds were thoroughly stirred to prepare a mixed system.

Subsequently, an aqueous solution containing polyvinyl alcohol (polymerization degree 2,000, saponification degree 86-89 mol%) and sodium dodecylbenzenesulfonate was added, and the system was stirred at 620 r.p.m. In this case, nitrogen gas was injected to sufficiently substitute and exclude the oxygen in the system. After completion of the nitrogen substitution, polymerization reaction was effected at 90°C first and then reaction was effected at 130°C while continuing the stirring to obtain a product comprising beads which were substantially uniform in diameter. The product was recovered by filtration, washed with water and air-dried, and then the physical properties thereof were measured. The results obtained were as shown in Table 1.

In the table, the styrene/ppo ratio and the water/styrene ratio were represented by weight ratios; the amounts of polyvinyl alcohol and sodium dodecylbenzenesulfonate were represented by wt% based on the weight of the water; and the amounts of the catalysts of lauroyl peroxide and dicumyl peroxide were represented by wt% based on the weight of the styrene monomer.

Table 1

| Run No. | 1 | 2 | 3 | 4 | 5 | Reference Example |
|---|---|---|---|---|---|---|
| Feed | | | | | | |
| Styrene/ppo | 2 | 1.8 | 1.5 | 1.3 | 0.95 | — |
| Water/styrene | 5 | 3 | 5 | 5 | 5 | 5 |
| Polyvinyl alcohol (%) | 0.05 | 0.3 | 0.5 | 0.1 | 0.5 | 0.5 |
| Sodium dodecylbenzene-sulfonate (%) | 0.01 | 0.01 | 0.01 | 0.01 | 0.01 | 0.01 |
| Lauroyl peroxide (%) | 0.6 | 0.6 | 0.6 | 0.6 | 0.6 | 0.6 |
| Dicumyl peroxide (%) | 0.3 | 0.3 | 0.4 | 0.6 | 0.3 | 0.3 |
| Polymerization time (hrs.) | 2  10 | 2  10 | 3  12 | 4  15 | 2  10 | 2  10 |
| Polymerization temperature (°C) | 90  130 | 90  130 | 90  130 | 90  130 | 90  130 | 90  130 |
| Polymerization product | | | | | | |
| Amount of unreacted styrene in beads (%) | 0.10 | 0.10 | 0.10 | 0.15 | 0.08 | |
| Graft conversion (%) | 83.1 | 87.3 | 90.1 | 94.8 | 95.3 | |
| Molecular weight of graft styrene | 82,000 | 80,000 | 76,000 | 74,000 | 72,000 | 45,000 |
| Physical properties | | | | | | |
| Tensile strength (kg/cm²) | 800 | 900 | 1,000 | 1,200 | 1,310 | |
| Tensile modulus (kg/cm²) | 12,000 | 13,000 | 14,000 | 14,500 | 14,600 | |
| Vicat softening point (°C) | 151.0 | 155.8 | 160.3 | 164.1 | 168.8 | |
| Coloration degree | Pale yellow | Pale yellow | Pale yellow | Pale yellow | Pale yellow | |

Reference Example shows the case where styrene was homopolymerized under the same conditions as in Run No. 1

EXAMPLE 2

Example 1 was repeated except that in place of using styrene singly, the styrene was used in combination with a mixture of p-methyl-α-methylstyrene and m-methyl-α-methylstyrene (the mole ratio of p-derivative/m-derivative was 4/6). The results obtained were as shown in Table 2.

Table 2

| Run No. | 1 | 2 | 3 | 4 | 5 | 6 |
|---|---|---|---|---|---|---|
| Feed | | | | | | |
| Styrene/ppo | 2 | 2 | 1.5 | 1.5 | 1.3 | 1.3 |
| Water/styrene | 5 | 5 | 5 | 5 | 5 | 5 |
| Styrene/o- and p-methyl-α-methylstyrenes | 2.5 | 4 | 3 | 6 | 3 | 6 |
| Polyvinyl alcohol (%) | 0.5 | 0.5 | 0.5 | 0.5 | 0.5 | 0.5 |
| Sodium dodecylbenzene-sulfonate (%) | 0.01 | 0.01 | 0.01 | 0.01 | 0.01 | 0.01 |
| Lauroyl peroxide (%) | 0.6 | 0.6 | 0.6 | 0.6 | 0.6 | 0.6 |
| Dicumyl peroxide (%) | 0.3 | 0.3 | 0.4 | 0.4 | 0.6 | 0.6 |
| Polymerization time (hrs.) | 2  10 | 2  10 | 3  12 | 3  12 | 4  15 | 4  15 |
| Polymerization temperature (°C) | 90  130 | 90  130 | 90  130 | 90  130 | 90  130 | 90  130 |
| Polymerization product | | | | | | |
| Amount of unreacted styrene in beads (%) | 0.10 | 0.10 | 0.15 | 0.15 | 0.20 | 0.20 |
| Graft conversion (%) | 82.0 | 80.8 | 89.3 | 87.2 | 92.1 | 92.8 |

Table 2—Continued

| Run No. | 1 | 2 | 3 | 4 | 5 | 6 |
|---|---|---|---|---|---|---|
| Physical properties | | | | | | |
| Tensile strength (kg/cm$^2$) | 800 | 810 | 980 | 1,000 | 1,200 | 1,190 |
| Tensile modulus (kg/cm$^2$) | 12,100 | 12,000 | 14,100 | 14,500 | 14,600 | 14,800 |
| Vicat softening point (°C) | 158.0 | 153.3 | 163.8 | 161.6 | 171.8 | 165.0 |
| Coloration degree | Pale yellow | Pale yellow | Pale yellow | Pale yellow | Pale yellow | Pale yellow |

EXAMPLE 3

Example 1 was repeated except that the catalyst and the reaction conditions were varied. The results obtained were as shown in Table 3.

Table 3

| Run No. | 1 | 2 | 3 | 4 | 5 | 6 | 7 | 8 |
|---|---|---|---|---|---|---|---|---|
| Feed | | | | | | | | |
| Styrene/ppo | 1 | 1.3 | 1.5 | 1.3 | 1.5 | 1.5 | 1.0 | 1.0 |
| Water/styrene | 5 | 5 | 5 | 5 | 5 | 5 | 5 | 5 |
| Polyvinyl alcohol (%) | 0.5 | 0.5 | 0.5 | 0.5 | 0.5 | 0.5 | 0.1 | 0.5 |
| Sodium dodecylbenzenesulfonate (%) | 0.01 | 0.01 | 0.01 | 0.01 | 0.01 | 0.01 | 0.01 | 0.01 |
| Catalyst | | | | | | | | |
| Kind | tert-Butyl peroxybenzoate | tert-Butyl peroxybenzoate | di-tert-Butyl peroxide | di-tert-Butyl peroxide | 2,6-Dichlorobenzoyl peroxide | 3,5,5-Trimethylhexanoyl peroxide | Dicumyl peroxide | Dicumyl peroxide |
| Amount (%) | 0.6 | 0.8 | 0.8 | 1.0 | 1.5 | 1.5 | 1.5 | 2.0 |
| Polymerization conditions (one stage polymerization) | | | | | | | | |
| Temperature (°C) | 110 | 110 | 130 | 130 | 80 | 80 | 130 | 130 |
| Time (hrs.) | 10 | 15 | 15 | 17 | 5 | 5 | 10 | 10 |
| Polymerization product | | | | | | | | |
| Amount of unreacted styrene in beads (%) | 0.09 | 0.10 | 0.10 | 0.10 | 0.40 | 0.30 | 0.15 | 0.10 |
| Graft conversion (%) | 86.0 | 89.0 | 87.0 | 90.0 | 85.0 | 86.0 | 88.0 | 90.0 |
| Molecular weight of graft styrene | 79,500 | 78,000 | 77,000 | 75,000 | 72,000 | 73,000 | 72,000 | 70,000 |
| Physical properties | | | | | | | | |
| Tensile strength (kg/cm$^2$) | 1,000 | 1,200 | 1,000 | 1,200 | 1,000 | 1,000 | 1,000 | 1,000 |
| Tensile modulus (kg/cm$^2$) | 14,000 | 14,500 | 14,100 | 14,600 | 14,000 | 14,000 | 14,000 | 14,500 |
| Vicat softening point (°C) | 160.8 | 165.1 | 162.0 | 165.3 | 160.0 | 161.0 | 169.0 | 170.0 |
| Coloration degree | Pale yellow | Pale yellow | Pale yellow | Pale yellow | Pale yellow | Pale yellow | Pale yellow | Pale yellow |

EXAMPLE 4

Into the same reaction means as in Example 1 was charged poly(2,6-dimethyl-1,4-phenylene oxide) ([$\eta$] = 0.65, measured in chloroform at 25°C) obtained according to polymerization (by oxidative coupling) using a manganese chloride (II)-sodium methylate catalyst. Water was added to the reaction means, and the compound was dispersed therein with stirring. Thereafter, a styrene solution containing lauroyl peroxide and dicumyl peroxide was added with vigorous stirring and uniformly absorbed in the polyphenylene oxide. In this system were dissolved polyvinyl alcohol (polymerization degree 2,000, saponification degree 86–89 mol%) and sodium dodecylbenzenesulfonate, and the oxygen in the system was sufficiently substituted with nitrogen gas. After completion of the nitrogen substitution, a polymerization reaction was effected with stirring at 90°C first and then a polymerization reaction was effected at 130°C to obtain a product comprising beads which were substantially uniform in diameter. The product was recovered by filtration, washed with water and air-dried, and then the properties thereof were measured to obtain the results shown in Table 4.

Table 4

| Run No. | 1 | | 2 | |
|---|---|---|---|---|
| Feed | | | | |
| Styrene/ppo | 2 | | 1.5 | |
| Water/styrene | 5 | | 5 | |
| Polyvinyl alcohol (%) | 0.5 | | 0.5 | |
| Sodium dodecylbenzenesulfonate (%) | 0.01 | | 0.01 | |
| Lauroyl peroxide (%) | 0.6 | | 0.6 | |
| Dicumyl peroxide (%) | 0.3 | | 0.4 | |
| Polymerization time (hrs.) | 2 | 10 | 3 | 12 |
| Polymerization temperature (°C) | 90 | 130 | 90 | 130 |
| Polymerization product | | | | |
| Amount of unreacted styrene monomer in beads (%) | 0.10 | | 0.10 | |
| Graft conversion (%) | 83.0 | | 90.0 | |
| Molecular weight of graft styrene | 82,000 | | 76,000 | |
| Physical properties | | | | |
| Tensile strength (kg/cm$^2$) | 800 | | 1,000 | |
| Tensile modulus (kg/cm$^2$) | 12,000 | | 14,000 | |

Table 4-Continued

| Run No. | 1 | 2 |
|---|---|---|
| Vicat softening point (°C) | 151.0 | 160.0 |
| Coloration degree | Pale yellow | Pale yellow |

EXAMPLE 5

To a 500 ml round-bottomed pressure-resistant polymerization reaction means equipped with a thermometer, a nitrogen-injecting pipe and a magnetic stirrer were added poly(2,6-dimethyl-1,4-phenylene oxide) ($[\eta] = 0.65$, measured in chloroform at 25°C) obtained according to polymerization by oxidative coupling using a manganese chloride (II)-sodium methylate catalyst, lauroyl peroxide, dicumyl peroxide and a styrene solution containing a rubbery polymer dissolved therein. The compounds were thoroughly stirred to prepare a mixed system.

Subsequently, an aqueous solution containing polyvinyl alcohol (polymerization degree 2,000, saponification degree 86–89 mol%) and sodium dodecylbenzenesulfonate was added, and the system was stirred at 620 r.p.m. In this case, nitrogen gas was injected to sufficiently substitute and exclude the oxygen in the system. After completion of the nitrogen substitution, a polymerization reaction was effected at 90°C first and then reaction was effected at 130°C while continuing the stirring to obtain a product comprising beads which were substantially uniform in diameter. The product was recovered by filtration, washed with water and air-dried, and then the physical properties thereof were measured. The results obtained were as shown in Table 5.

The rubbery polymer was a polymer prepared by graft-copolymerizing styrene on polybutadiene and had a styrene/butadiene ratio of 4/6, and the amount thereof was represented by wt% based on the weight of the resulting polymer. The amounts of the dispersion stabilizers, i.e. polyvinyl alcohol and sodium dodecylbenzenesulfonate, were represented by wt% based on the weight of the water, and the amounts of the catalysts were represented by wt% based on the weight of the styrene monomer.

Table 5

| Run No. | 1 | | 2 | | 3 | | 4 | |
|---|---|---|---|---|---|---|---|---|
| Feed | | | | | | | | |
| Styrene/ppo | 2 | | 1.8 | | 1.5 | | 1.3 | |
| Water/styrene | 5 | | 5 | | 5 | | 5 | |
| Rubbery polymer (%) | 5 | | 5 | | 5 | | 5 | |
| Polyvinyl alcohol (%) | 0.5 | | 0.5 | | 0.5 | | 0.5 | |
| Sodium dodecylbenzenesulfonate (%) | 0.01 | | 0.01 | | 0.01 | | 0.01 | |
| Lauroyl peroxide (%) | 0.6 | | 0.6 | | 0.6 | | 0.6 | |
| Dicumyl peroxide (%) | 0.3 | | 0.3 | | 0.4 | | 0.6 | |
| Polymerization time (hrs.) | 2 | 10 | 2 | 10 | 3 | 12 | 4 | 15 |
| Polymerization temperature (°C) | 90 | 130 | 90 | 130 | 90 | 130 | 90 | 130 |
| Polymerization product | | | | | | | | |
| Amount of unreacted styrene monomer in beads (%) | 0.04 | | 0.08 | | 0.10 | | 0.15 | |
| Graft conversion (%) | 83.1 | | 87.0 | | 85.8 | | 91.9 | |
| Molecular weight of graft polymer | 81,000 | | 80,000 | | 75,000 | | 74,000 | |
| Average diameter of polymer beads (mm) | 0.8 | | 0.9 | | 1.0 | | 1.1 | |
| Physical properties | | | | | | | | |
| Tensile strength (kg/cm²) | 790 | | 800 | | 820 | | 850 | |
| Tensile modulus (kg/cm²) | 12,000 | | 11,500 | | 11,800 | | 12,200 | |
| Vicat softening point (°C) | 149.3 | | 153.0 | | 157 | | 159 | |
| Charpy impact value (kg.cm/cm²) | 15.0 | | 17.0 | | 18.0 | | 19.0 | |
| Coloration degree | Pale yellow | | Pale yellow | | Pale yellow | | Pale yellow | |

EXAMPLE 6

Example 5 was repeated, except that in place of the styrene, there was used a mixture of p-methyl-α-methylstyrene and m-methyl-α-methylstyrene (the mole ratio of p-derivative/m-derivative was 4/6) in combination with styrene. The results obtained were as shown in Table 6. 8n

Table 6

| Run No. | 1 | | 2 | | 3 | | 4 | |
|---|---|---|---|---|---|---|---|---|
| Feed | | | | | | | | |
| Styrene/ppo | 2 | | 1.8 | | 1.5 | | 1.3 | |
| Water/styrene | 3 | | 3 | | 3 | | 3 | |
| Styrene/m- and p-methyl-α-methylstyrenes | 3 | | 3 | | 3 | | 3 | |
| Polyvinyl alcohol (%) | 0.1 | | 0.05 | | 0.5 | | 0.5 | |
| Sodium dodecylbenzenesulfonate (%) | 0.01 | | 0.001 | | 0.01 | | 0.005 | |
| Lauroyl peroxide (%) | 0.6 | | 0.6 | | 0.6 | | 0.6 | |
| Dicumyl peroxide (%) | 0.3 | | 0.3 | | 0.4 | | 0.6 | |
| Rubbery polymer (%) | 5 | | 5 | | 5 | | 5 | |
| Polymerization time (hrs.) | 2 | 10 | 2 | 10 | 3 | 12 | 4 | 15 |
| Polymerization temperature (°C) | 90 | 130 | 90 | 130 | 90 | 130 | 90 | 130 |
| Polymerization product | | | | | | | | |
| Amount of unreacted styrene monomer in beads (%) | 0.10 | | 0.10 | | 0.10 | | 0.15 | |
| Graft conversion (%) | 80.9 | | 88.2 | | 88.0 | | 89.8 | |
| Average diameter of beads (mm) | 0.7 | | 0.8 | | 1.0 | | 1.2 | |

Table 6—Continued

| Run No. | 1 | 2 | 3 | 4 |
|---|---|---|---|---|
| Physical properties | | | | |
| Tensile strength (kg/cm$^2$) | 780 | 790 | 800 | 820 |
| Tensile modulus (kg/cm$^2$) | 12,000 | 11,500 | 11,000 | 12,900 |
| Vicat softening point (°C) | 159 | 160 | 162 | 164 |
| Charpy impact value (kg·cm/cm$^2$) | 18 | 17 | 17 | 18 |
| Coloration degree | Pale yellow | Pale yellow | Pale yellow | Pale yellow |

EXAMPLE 7

Example 5 was repeated, except that the kind of the rubbery polymer was varied. The results obtained were as shown in Table 7.

EXAMPLE 8

Example 5 was repeated, except that the catalyst and the polymerization conditions were varied. The results obtained were as shown in Table 8.

Table 7

| Run No. | 1 | 2 | 3 | 4 | 5 |
|---|---|---|---|---|---|
| Feed | | | | | |
| Styrene/ppo | 5 | 1.5 | 1.5 | 1.5 | 1.5 |
| Water/styrene | 5 | 5 | 5 | 5 | 5 |
| Rubbery polymer | | | | | |
| Kind | Polybutadiene (1) | Butadiene-styrene copolymer (2) | Butadiene-acrylonitrile copolymer (3) | Polybutadiene (4) | Natural rubber (5) |
| Amount (%) | 5 | 5 | 5 | 5 | 5 |
| Polyvinyl alcohol (%) | 0.5 | 0.5 | 0.5 | 0.5 | 0.5 |
| Sodium dodecylbenzenesulfonate (%) | 0.01 | 0.01 | 0.01 | 0.01 | 0.01 |
| Lauroyl peroxide (%) | 0.6 | 0.6 | 0.6 | 0.6 | 0.6 |
| Dicumyl peroxide (%) | 0.4 | 0.4 | 0.4 | 0.4 | 0.4 |
| Polymerization time (hrs.) | 3  12 | 3  12 | 3  12 | 3  12 | 3  12 |
| Polymerization temperature (°C) | 90  130 | 90  130 | 90  130 | 90  130 | 90  130 |
| Polymerization product | | | | | |
| Amount of unreacted styrene monomer in beads (%) | 0.10 | 0.10 | 0.10 | 0.10 | 0.10 |
| Graft conversion (%) | 87 | 87 | 88 | 86 | 88 |
| Molecular weight of graft styrene | 75,000 | 75,000 | 75,000 | 75,500 | 76,000 |
| Average diameter of beads (mm) | 1.1 | 1.3 | 1.5 | 1.0 | 1.0 |
| Physical properties | | | | | |
| Tensile strength (kg/cm$^2$) | 800 | 790 | 810 | 820 | 800 |
| Tensile modulus (kg/cm$^2$) | 12,000 | 11,800 | 12,000 | 11,900 | 12,100 |
| Vicat softening point (°C) | 157.0 | 159.0 | 160.0 | 158.5 | 159.5 |
| Charpy impact value (kg.cm/cm$^2$) | 16.0 | 17.0 | 18.0 | 18.0 | 17.0 |
| Coloration degree | Pale yellow | Pale yellow | Pale yellow | Pale yellow | Pale yellow |

(1) = JSR 0700 produced by Japan Synthetic Rubber Co., Ltd.
(2) = JSR 1500 produced by Japan Synthetic Rubber Co., Ltd.
(3) = 240S produced by Japan Synthetic Rubber Co., Ltd.
(4) = NF 35A produced by Asahi Kasei Kogyo Kabushiki Kaisha
(5) = RSS No. 1

Table 8

| Run No. | 1 | 2 | 3 | 4 | 5 | 6 |
|---|---|---|---|---|---|---|
| Feed | | | | | | |
| Styrene/ppo | 1.5 | 1.5 | 1.5 | 1.5 | 1.0 | 1.0 |
| Water/styrene | 5 | 5 | 5 | 5 | 5 | 5 |
| Amount of rubbery polymer (%) | 5 | 5 | 5 | 5 | 5 | 5 |
| Polyvinyl alcohol (%) | 0.5 | 0.5 | 0.5 | 0.5 | 0.5 | 0.5 |
| Sodium dodecylbenzenesulfonate (%) | 0.01 | 0.01 | 0.01 | 0.01 | 0.01 | 0.01 |
| Catalyst | | | | | | |
| Kind | 2,4-Dichlorobenzoyl | tert-Butyl peroxy- | Di-tert-butyl | Di-tert-butyl | Dicumyl peroxide | Dicumyl peroxide |
| Amount (%) | 1.5 | 1.5 | 0.8 | 0.1 | 1.0 | 2.0 |
| Polymerization conditions | | | | | | |
| Temperature (°C) | 70 | 70 | 130 | 130 | 130 | 130 |
| Time (hrs.) | 4 | 5 | 20 | 25 | 10 | 10 |
| Polymerization product | | | | | | |
| Amount of unreacted styrene monomer in beads (%) | 0.10 | 0.15 | 0.15 | 0.25 | 0.15 | 0.10 |
| Graft conversion (%) | 80.0 | 84.0 | 87.0 | 84.0 | 85.0 | 88.0 |
| Molecular weight of graft styrene | 70,000 | 72,000 | 77,000 | 79,500 | 71,000 | 70,000 |
| Average diameter of beads (mm) | 1.0 | 1.2 | 1.2 | 1.4 | 1.5 | 1.5 |
| Physical properties | | | | | | |
| Tensile strength (kg/cm$^2$) | 800 | 820 | 810 | 830 | 840 | 850 |
| Tensile modulus (kg/cm$^2$) | 12,000 | 11,800 | 12,100 | 12,000 | 12,000 | 12,100 |
| Vicat softening point (°C) | 159.0 | 160.0 | 158.0 | 155.0 | 161.0 | 162.0 |
| Charpy impact value (kg.cm/cm$^2$) | 17.0 | 18.0 | 19.0 | 15.0 | 15.0 | 15.0 |
| Coloration degree | Pale yellow | Pale yellow | Pale yellow | Pale yellow | Pale yellow | Pale yellow |

EXAMPLE 9

To a 500 ml round-bottomed pressure-resistant polymerization reaction means equipped with a thermometer, a nitrogen-injecting pipe and a magnetic stirrer were added poly(2,6-dimethyl-1,4-phenylene oxide) ([$\eta$] = 0.65, measured in chloroform at 25°C) obtained according to polymerization by oxidative coupling using a manganese chloride (II)-sodium methylate catalyst, styrene, lauroyl peroxide and dicumyl peroxide. The compounds were thoroughly stirred to prepare a mixed system. On the other hand, a mixed system containing a rubbery polymer dissolved therein was also prepared in the same manner as above. Subsequently, an aqueous solution containing polyvinyl alcohol (polymerization degree 2,000, saponification degree 86–89 mol%) was added, and the system was stirred at 620 r.p.m. In this case, nitrogen gas was injected to sufficiently substitute and exclude the oxygen in the system. After completion of the nitrogen substitution, a first stage polymerization reaction was effected at 90°C while continuing the stirring, and then the styrene and the water were azeotropically removed by steam distillation at 94°C to withdraw a given amount of the styrene out of the system. Subsequently, a second stage polymerization reaction was effected at 130°C to obtain a product comprising beads which were substantially uniform in diameter. The product was recovered by filtration, washed with water and air-dried, and then the physical properties thereof were measured. The results obtained were as shown in Table 9.

The rubbery polymer used was a polybutadienestyrene graft copolymer obtained by graft polymerizing styrene on polybutadiene and had a styrene/butadiene, ratio of 4/6, and the amount thereof was represented by wt% based on the weight of the polymer produced. The amounts of the dispersion stabilizers, i.e. polyvinyl alcohol and sodium dodecylbenzenesulfonate, were represented by wt% based on the weight of the water, and the amounts of the catalysts were represented by wt% based on the weight of the initial amount of the styrene.

Table 9

| Run No. | 1 | | 2 | | 3 | | 4 | |
|---|---|---|---|---|---|---|---|---|
| Feed | | | | | | | | |
| Styrene/ppo | 4 | | 4 | | 3 | | 3 | |
| Water/styrene | 3 | | 4 | | 6 | | 3 | |
| Rubbery polymer | | | | | | | | |
| Kind | — | | Polybutadiene-styrene graft copolymer | | — | | Polybutadiene-styrene graft copolymer | |
| Amount (%) | | | 5 | | | | 5 | |
| Polyvinyl alcohol (%) | 0.5 | | 0.2 | | 0.05 | | 0.1 | |
| Sodium dodecylbenzenesulfonate (%) | 0.01 | | 0.01 | | 0.005 | | 0.01 | |
| Lauroyl peroxide (%) | 0.30 | | 0.30 | | 0.35 | | 0.35 | |
| Dicumyl peroxide (%) | 0.15 | | 0.15 | | 0.15 | | 0.15 | |
| Polymerization conditions | | | | | | | | |
| Styrene/ppo in the second stage reaction | 1 | | 1 | | 1 | | 1 | |
| Time (hrs.) | First stage | Second stage | First stage | Second stage | First stage | second stage | First stage | Second stage |
| | 1 | 10 | 0.4 | 10 | 1.5 | 10 | 1.0 | 10 |
| Polymerization product | | | | | | | | |
| Amount of unreacted styrene monomer in beads (%) | 0.05 | | 0.08 | | 0.09 | | 0.12 | |
| Graft conversion (%) | 84.1 | | 87.3 | | 89.8 | | 94.1 | |
| Molecular weight of graft styrene | 72,000 | | 72,000 | | 70,000 | | 70,000 | |
| Physical properties | | | | | | | | |
| Tensile strength (kg/cm$^2$) | 850 | | 790 | | 960 | | 780 | |
| Tensile modulus (kg/cm$^2$) | 14,300 | | 13,800 | | 13,700 | | 14,000 | |
| Vicat softening point (°C) | 161.6 | | 158.9 | | 164.4 | | 160.2 | |
| Charpy impact value (kg.cm/cm$^2$) | 5 | | 18 | | 5 | | 18 | |

EXAMPLE 10

Example 9 was repeated, except that in place of the styrene, a mixture of p-methyl-α-methylstyrene and m-methyl-α-methylstyrene (the mole ratio of p-derivative/m-derivative was 4/6) was used in combination with styrene. The results obtained were as shown in Table 10.

Table 10

| Run No. | 1 | | 2 | | 3 | | 4 | |
|---|---|---|---|---|---|---|---|---|
| Feed | | | | | | | | |
| Styrene/ppo | 3 | | 5 | | 8 | | 4 | |
| Water/styrene | 5 | | 5 | | 5 | | 5 | |
| Styrene/m- and p-methyl-α-methylstyrenes | 5 | | 5 | | 4 | | 4 | |
| Polyvinyl alcohol (%) | 0.05 | | 0.5 | | 0.1 | | 0.5 | |
| Sodium dodecylbenzenesulfonate (%) | 0.001 | | 0.01 | | 0.005 | | 0.01 | |
| Lauroyl peroxide (%) | 0.35 | | 0.35 | | 0.35 | | 0.35 | |
| Dicumyl peroxide (%) | 0.15 | | 0.15 | | 0.15 | | 0.15 | |
| Rubbery polymer | | | | | | | | |
| Kind | — | | Polybutadiene (1) | | Butadiene-styrene graft copolymer (2) | | Butadiene-styrene graft copolymer (3) | |
| Amount (%) | — | | 5 | | 5 | | 5 | |
| Polymerization time (hrs.) | First stage | Second stage | First stage | Second stage | First stage | Second stage | First stage | Second stage |
| | 2 | 10 | 0.4 | 11 | 0.15 | 15 | 1 | 14 |

Table 10—Continued

| Run No. | 1 | 2 | 3 | 4 |
|---|---|---|---|---|
| Polymerization product | | | | |
| Amount of unreacted styrene in beads (%) | 0.10 | 0.10 | 0.10 | 0.15 |
| Graft conversion (%) | 79.8 | 78.0 | 90.1 | 83.8 |
| Physical properties | | | | |
| Tensile strength (kg/cm$^2$) | 980 | 860 | 880 | 920 |
| Tensile modulus (kg/cm$^2$) | 14,500 | 12,700 | 11,900 | 12,000 |
| Vicat softening point (°C) | 166.0 | 161.8 | 163.2 | 164.1 |
| Charpy impact value (kg.cm/cm$^2$) | 5 | 18 | 19 | 19 |

(1) = JSR 0700 produced by Japan Synthetic Rubber Co., Ltd.
(2) = JSR 1500 produced by Japan Synthetic Rubber Co., Ltd.
(3) = The rubbery polymer used in Example 9.

EXAMPLE 11

Example 9 was repeated, except that the kind of the rubbery polymer was varied. The results obtained were as shown in Table 11.

EXAMPLE 12

Example 9 was repeated, except that the catalyst and the polymerization conditions were varied. As the rubbery polymer, there was used the polybutadiene-styrene graft copolymer of Example 9. The results obtained were as shown in Table 12.

Table 11

| Run No. | 1 | | 2 | | 3 | | 4 | |
|---|---|---|---|---|---|---|---|---|
| Feed | | | | | | | | |
| Styrene/ppo | 3 | | 3 | | 3 | | 3 | |
| Water/styrene | 3 | | 3 | | 3 | | 3 | |
| Rubbery polymer | | | | | | | | |
| Kind | Polybutadiene (1) | | Butadiene-styrene copolymer (2) | | Butadiene-acrylonitrile copolymer (3) | | Polybutadiene (4) | |
| Amount (%) | 5 | | 5 | | 5 | | 5 | |
| Polyvinyl alcohol (%) | 0.1 | | 0.1 | | 0.1 | | 0.1 | |
| Sodium dodecylbenzenesulfonate (%) | 0.01 | | 0.01 | | 0.01 | | 0.01 | |
| Lauroyl peroxide (%) | 0.35 | | 0.35 | | 0.35 | | 0.35 | |
| Dicumyl peroxide (%) | 0.15 | | 0.15 | | 0.15 | | 0.15 | |
| Polymerization conditions | | | | | | | | |
| Styrene/ppo in the second stage reaction | 1 | | 1 | | 1 | | 1 | |
| Time (hrs.) | First stage | Second stage | First stage | Second stage | First stage | Second stage | First stage | Second stage |
| | 1 | 10 | 1 | 10 | 1 | 10 | 1 | 10 |
| Polymerization product | | | | | | | | |
| Amount of unreacted styrene in beads (%) | 0.10 | | 0.10 | | 0.12 | | 0.15 | |
| Graft conversion (%) | 90.0 | | 91.0 | | 92.0 | | 90.0 | |
| Molecular weight of graft styrene | 70,000 | | 71,000 | | 70,000 | | 71,500 | |
| Physical properties | | | | | | | | |
| Tensile strength (kg/cm$^2$) | 770 | | 770 | | 790 | | 780 | |
| Tensile modulus (kg/cm$^2$) | 13,700 | | 13,900 | | 13,700 | | 14,000 | |
| Vicat softening point (°C) | 158.5 | | 161.0 | | 160.0 | | 162.0 | |
| Charpy impact value (kg.cm/cm$^2$) | 18 | | 17 | | 16 | | 19 | |

(1) = JSR 0700 produced by Japan Synthetic Rubber Co., Ltd.
(2) = JSR 1500 produced by Japan Synthetic Rubber Co., Ltd.
(3) = N 420S produced by Japan Synthetic Rubber Co., Ltd.
(4) = NF-35A produced by Asahi Kasei Kogyo Kabushiki Kaisha Table 12

| Run No. | 1 | | 2 | | 3 | | 4 | |
|---|---|---|---|---|---|---|---|---|
| Feed | | | | | | | | |
| Styrene/ppo | 3 | | 3 | | 3 | | 3 | |
| Water/styrene | 3 | | 3 | | 3 | | 3 | |
| Amount of rubbery polymer (%) | 5 | | 5 | | 5 | | 5 | |
| Polyvinyl alcohol (%) | 0.1 | | 0.1 | | 0.1 | | 0.1 | |
| Sodium dodecylbenzenesulfonate (%) | 0.01 | | 0.01 | | 0.01 | | 0.01 | |
| Catalysts | | | | | | | | |
| Kinds and amounts (%) | Octanoyl peroxide 0.3 | | 2,4-Dichlorobenzoyl peroxide 0.3 | | 3,5,5-Trimethylhexanoyl peroxide 0.3 | | tert-Butyl peroxypivalate 0.3 | |
| | di-tert-Butyl peroxide 0.3 | | tert-Butyl peroxybenzoate 0.3 | | tert-Butyl peroxybenzoate 0.5 | | Dicumyl peroxide 0.5 | |
| Polymerization conditions | | | | | | | | |
| Styrene/ppo in the second stage reaction | 1 | | 1 | | 1 | | 1 | |
| Time (hrs.) | First stage | Second stage | First stage | Second stage | First stage | Second stage | First stage | Second stage |
| | 1 | 15 | 0.5 | 10 | 1 | 5 | 0.5 | 10 |

Table 12—Continued

| Run No. | 1 | 2 | 3 | 4 |
|---|---|---|---|---|
| Polymerization product | | | | |
| Amount of unreacted styrene in beads (wt%) | 0.10 | 0.15 | 0.15 | 0.10 |
| Graft conversion (%) | 90.0 | 89.0 | 88 | 92.0 |
| Molecular weight of graft styrene | 70,000 | 71,000 | 70,000 | 70,000 |
| Physical properties | | | | |
| Tensile strength (kg/cm²) | 780 | 770 | 780 | 790 |
| Tensile modulus (kg/cm²) | 14,000 | 14,100 | 14,000 | 13,800 |
| Vicat softening point (°C) | 160.5 | 160.2 | 160.2 | 160.0 |
| Charpy impact value (kg.cm/cm²) | 17 | 18 | 17 | 18 |

EXAMPLE 13

Example 1 was repeated except that there were applied different polyphenylene oxides, catalysts, dispersion agents, and reaction conditions than those in the previous case. The results obtained were shown in Table 13.

EXAMPLE 14

Example 1 was repeated except that there were applied different styrenes, dispersion agents, catalysts, and reaction conditions than those in the previous case. The results obtained were shown in Table 14.

Table 13

| Run No. | 1 | 2 | 3 | 4 | 5 |
|---|---|---|---|---|---|
| Feed | | | | | |
| Polyphenylene oxide* | A | B | C | D | E |
| Styrene/ppo | 0.6 | 1.0 | 1.2 | 0.7 | 1.1 |
| Water/styrene | 5.0 | 5.0 | 3.7 | 5.0 | 2.0 |
| Dispersion stabilizer** | 0.10(a) | 0.03(b) | .12(c) | 0.30(d) | 0.10(a) |
| Surfactant*** | 0.01(e) | 0.001(f) | 0.004(e) | .002(e) | 0.001(e) |
| Catalyst | | | | | |
| Kind | t-Butyl perochlorobenzoate | Cyclohexanone peroxide | Di-isopropyl benzene hydroperoxide | Benzoyl peroxide | Dicumyl peroxide |
| Amount (%) | 1.1 | 2.0 | 1.8 | 1.2 | 1.0 |
| Polymerization | | | | | |
| Temperature (°C) | 140 | 140 | 120 | 100 | 140 |
| Time (hrs.) | 5 | 10 | 15 | 14 | 5 |
| Polymerization product | | | | | |
| Amount of unreacted styrene in beads (%) | 0.02 | 0.03 | 0.12 | 0.09 | 0.14 |
| Graft conversion (%) | 89.0 | 91.0 | 79.0 | 93.0 | 90.6 |
| Molecular weight of graft styrene | 66,000 | 62,000 | 71,000 | 63,000 | 69,000 |
| Physical properties | | | | | |
| Vicat softening point (°C) | 148 | 152 | 147 | 144 | 151 |

\* Polyphenylene oxide
(A) Poly-2,6-dichloro-1,4-phenylene oxide
(B) Poly-2,6-di(2-chloroethyl)-1,4-phenylene oxide
(C) Poly-2,6-dimethoxy-1,4-phenylene oxide
(D) Poly-2-allyl-6-methyl-1,4-phenylene oxide
(E) Poly-2,6-dibromoethoxy-1,4-phenylene oxide
\*\* Dispersion stabilizer
(a) Sodium salt of polymethacrylic acid
(b) Gelatine
(c) Sodium salt of copolymer of styrene and maleic anhydride
(d) Polyacrylamide
\*\*\* Surfactant
(e) Polyoxyethylene monooleate
(f) Sodium stearate
(g) Rosin soap
(h) Carboxymethyl cellulose sodium salt Table 14

| Run No. | 1 | 2 | 3 | 4 | 5 | 6 |
|---|---|---|---|---|---|---|
| Feed | | | | | | |
| Styrenes* | (1) | (2) | (3) | (4) | (5) | (6) |
| Styrenes/ppo | 1.5 | 1.5 | 1.5 | 1.5 | 1.5 | 1.5 |
| Styrenes/α-alkyl styrene | — | — | — | — | 2 | 1.5 |
| Water/monomer | 4.0 | 4.5 | 5.0 | 5.0 | 4.5 | 5.0 |
| Polyvinyl alcohol (%) | 0.4 | 0.1 | 0.2 | 0.01 | 0.05 | 0.08 |
| Methyl cellulose (%) | 0.001 | 0.01 | 0.005 | 0.10 | 0.03 | 0.05 |
| Benzoyl peroxide (%) | 0.5 | 0.1 | 0.9 | 0.1 | 0.10 | 0.5 |
| Dicumyl peroxide (%) | 0.9 | 1.5 | 0.5 | 1.0 | 2.0 | 2.0 |
| Polymerization time (hrs.) | 1  10 | 1  8 | 1  10 | 1  10 | 1  8 | 1  15 |
| Polymerization temperature (°C) | 90  130 | 90  130 | 90  130 | 90  130 | 90  140 | 90  130 |
| Polymerization product | | | | | | |
| Amount of unreacted styrene in beads (%) | 0.10 | 0.15 | 0.10 | 0.05 | 0.18 | 0.19 |
| Graft conversion (%) | 88.0 | 85.0 | 82.0 | 87.0 | 85.0 | 88.0 |

Table 14—Continued

| Run No. | 1 | 2 | 3 | 4 | 5 | 6 |
|---|---|---|---|---|---|---|
| Physical properties | | | | | | |
| Tensile strength (kg/cm²) | 910 | 820 | — | — | — | 930 |
| Vicat softening point (°C) | 162.5 | 161.3 | 159.2 | 154.1 | 167.1 | 164.3 |

* Styrenes
(1) p-Methylstyrene
(2) p-Chlorostyrene
(3) p-Chloromethoxystyrene
(4) p-Methoxystyrene
(5) m-Bromo-α-methylstyrene + Styrene
(6) p-Methoxy-α-methylstyrene + p-methylstyrene

What is claimed is:
1. A process for producing modified polyphenylene oxide which consisting essentially of
   1. polymerizing 0.4 to 2 parts by weight of at least one styrene compound represented by the formula,

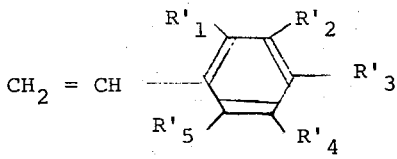

wherein $R'_1$, $R'_2$, $R'_3$, $R'_4$ and $R'_5$ are independently a hydrogen atom, a halogen atom, a cyano group, a nitro group, an amino group, an hydroxy group, a carboxyl group, a hydrocarbon or a halogen-or a cyano-substituted hydrocarbon group having 12 or less carbon atoms, or a hydrocarbonoxy or a halogen- or hydrocarbonoxy-substituted hydrocarbonoxy group having 12 or less carbon atoms, or a mixture of said styrene compound with an α-substituted styrene represented by the formula,

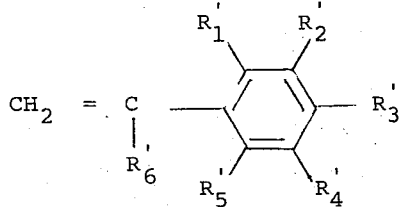

wherein $R'_1$, $R'_2$, $R'_3$, $R'_4$ and $R'_5$ are as defined above, and $R'_6$ is a hydrocarbon group having 12 or less carbon atoms
in the presence of 1 part by weight of a polyphenylene oxide having a structure represented by the formula,

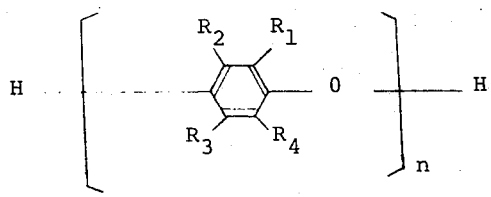

wherein $R_1$, $R_2$, $R_3$, and $R_4$ are independently a hydrogen atom, a halogen atom, a hydrocarbon or a halogen- or cyano-substituted hydrocarbon group having 12 or less carbon atoms, or a hydrocarbonoxy or a halogen- or cyano-substituted hydrocarbonoxy group having 12 or less carbons; and n represents the degree of polymerization, and is an integer greater than 50 in an aqueous dispersion containing water in an amount of 1 to 10 parts by weight per 1 part by weight of the mixture of polyphenylene oxide and styrene compound and a dispersion stabilizer or said dispersion stabilizer and at least one member selected from the group consisting of a surface active agent and an adhesion-preventing agent in an amount of 0.01 to 1.5% by weight based on the weight of the water and a radical initiator or
   2. polymerizing 15 to 60 parts by weight of a styrene compound as defined above, or a mixture of said styrene compound with an α-substituted styrene as defined above in the presence of 85 to 40 parts by weight of a mixture comprising 74 to 96% by weight of a polyphenylene oxide as defined above and 26 to 4% by weight of a rubbery polymer selected from the group consisting of polybutadiene, polyisoprene, polychloroprene, a butadiene-styrene copolymer, a butadiene-styrene block copolymer, a polybutadiene-styrene graft copolymer, a polyisoprene-styrene graft copolymer, an isoprene-styrene copolymer, an isobutyleneisoprene copolymer, a polybutadiene-acrylonitrile-styrene graft copolymer, a butadiene-acrylonitrile copolymer, a polybutadiene-styrene-α-methylstyrene graft copolymer, a polybutadiene-styrene-methylmethacrylate graft copolymer, a poly-(butadiene-styrene)-styrene graft copolymer, a poly-(butadiene-styrene)-styrene graft copolymer, a poly-(butadiene-styrene)-styrene-acrylonitrile graft copolymer, a poly-(butadiene-acrylonitrile)-styrene graft copolymer, a poly-(butadiene-acrylonitrile)-styrene graft copolymer and an ethylene-styrene copolymer
in an aqueous dispersion containing water in an amount of 1 to 10 parts by weight per 1 part by weight of the mixture of polyphenylene oxide, rubbery polymer, and styrene compound and a dispersion stabilizer or said dispersion stabilizer and at least one member selected from the group consisting of a surface active agent and an adhesion-preventing agent in an amount of 0.01 to 1.5% by weight based on the weight of the water and a radical initiator.

2. A process according to claim 1, wherein the reaction temperature is 40° to 150°C.

3. A process according to claim 1, wherein the styrene compound is at least one member selected from the group consisting of styrene, 2,4-dichlorostyrene, p-methoxystyrene, p-nitrostyrene, p-methylstyrene, 3,4-dimethylstyrene, m-tert.-butylstyrene, p-dodecylstyrene, p-phenylstyrene, p-acetoxystyrene, divinylbenzene, p-aminostyrene, p-(chloromethoxy)-styrene, m-cyanostyrene, vinyl benzoic acid and o-hydroxystyrene.

4. A process according to claim 1, wherein the α-substituted styrene compound is at least one member selected from the group consisting of α-methylstyrene, α-propylstyrene, α-undecylstyrene, o-methyl-α-methylstyrene, m-methyl-α-methylstyrene, p-methyl-α-methylstyrene, p-methoxy-α-methylstyrene, p-cyano-α-methylstyrene, m-bromo-α-methylstyrene, p-chloro-α-methylstyrene and 1,1-diphenylethylene.

5. A process according to claim 1, wherein the polyphenylene oxide is one member selected from the group consisting of poly-2,6-dimethyl-1,4-phenylene oxide, poly-2,6-diethyl-1,4-phenylene oxide, poly-2,6-dipropyl-1,4-phenylene oxide, poly-2-methyl-6-allyl-1,4-phenylene oxide, poly-2,6-dimethoxy-1,4-phenylene oxide, poly-2,6-dichloromethyl-1,4-phenylene oxide, poly-2,6-dibromomethyl-1,4-phenylene oxide, poly-2,6-ditolyl-1,4-phenylene oxide, poly-2,6-dichloro-1,4-phenylene oxide, poly-2,6-diphenyl-1,4-phenylene oxide and poly-2,5-dimethyl-1,4-phenylene oxide.

6. A process according to claim 1, wherein the radical initiator is an organic peroxide.

7. A process according to claim 1, wherein the organic peroxide is one member selected from the group consisting of decanoyl peroxide, benzoyl peroxide, lauroyl peroxide, octanoyl peroxide, stearoyl peroxide, 3,5,5-trimethylhexanoyl peroxide, tert-butyl perbenzoate, tert-butyl peracetate, tert-butyl perpivalate, diisopropylbenzene hydroperoxide, 2,5-dimethyl-2,5-di-tert-butyl peroxide, di-tert-butyl peroxide, cyclohexanone peroxide, dicumyl peroxide, α,α'-azobisisobutyronitrile, tert-butyl peroxyisobutyrate, and tert-butyl peroxylaurate.

8. A process according to claim 1, wherein the styrene compound or the mixture thereof with the α-substituted styrene is fed in an amount of 0.4 to 2 parts by weight per part by weight of the polyphenylene oxide or a mixture thereof with the rubbery polymer, unreacted styrene compound and α-substituted styrene are distilled off in the course of the reaction, the styrene compound and α-substituted styrene remaining in the polymerization system are adjusted to the composition of the desired modified polyphenylene oxide, and then the polymerization is completed.

* * * * *